12

United States Patent
Wild et al.

(10) Patent No.: US 9,509,480 B2
(45) Date of Patent: Nov. 29, 2016

(54) METHOD AND APPARATUS FOR TRANSMITTING CHANNEL FEEDBACK INFORMATION IN A WIRELESS COMMUNICATION SYSTEM AND METHOD AND APPARATUS FOR RECEIVING CHANNEL FEEDBACK INFORMATION IN A WIRELESS COMMUNICATION SYSTEM

(71) Applicant: Alcatel Lucent, Boulogne Billancourt (FR)

(72) Inventors: Thorsten Wild, Stuttgart (DE);
Federico Boccardi, Vimercate (IT);
Paolo Baracca, San Bonifacio (VR) (IT)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/423,178

(22) PCT Filed: Jul. 9, 2013

(86) PCT No.: PCT/EP2013/064453
§ 371 (c)(1),
(2) Date: Feb. 23, 2015

(87) PCT Pub. No.: WO2014/029550
PCT Pub. Date: Feb. 27, 2014

(65) Prior Publication Data
US 2015/0229456 A1    Aug. 13, 2015

(30) Foreign Application Priority Data

Aug. 23, 2012 (EP) ..................................... 12306017

(51) Int. Cl.
*H04L 5/00* (2006.01)
*H04B 7/06* (2006.01)
(Continued)

(52) U.S. Cl.
CPC ............. *H04L 5/0057* (2013.01); *H04B 7/024* (2013.01); *H04B 7/0456* (2013.01);
(Continued)

(58) Field of Classification Search
CPC .... H04B 7/024; H04B 7/026; H04B 7/0632; H04B 7/0634; H04B 7/0645; H04B 7/0456; H04L 1/003; H04L 5/0035; H04W 72/0413
See application file for complete search history.

(56) References Cited

U.S. PATENT DOCUMENTS

2008/0080635 A1* 4/2008 Hugl et al. ..................... 375/267
2010/0035644 A1* 2/2010 Wu et al. ......................... 455/517
(Continued)

FOREIGN PATENT DOCUMENTS

| WO | 2010123304 | 10/2010 |
| WO | 2012046883 | 4/2012 |

(Continued)

OTHER PUBLICATIONS

Je et al. "Long-Term Channel Information-Based CoMP Beamforming in LTE-Advanced Systems", Dec. 2011, Global Telecommunications Conference 2011 IEEE, pp. 1-6.*

(Continued)

*Primary Examiner* — Sophia Vlahos
(74) *Attorney, Agent, or Firm* — Fay Sharpe, LLP

(57) ABSTRACT

The invention relates to a method (MET-T) for transmitting channel feedback information in a wireless communication system. The method (MET-T) contains the steps of determining (M1/5) a first reception quality value (CQI 1) for a first radio channel from a first transmission point (2a) of the radio communication system to an apparatus (4), determining (M1/7) based on the first reception quality value (CQI 1) a preferred use of the first radio channel (6a), and transmitting (M1/8) towards the first transmission point (2a) the first reception quality value (CQI 1) and the first reception quality value (CQI 1) simultaneously indicates the preferred use. The invention further relates to an apparatus for transmitting channel feedback information in the wireless communication system and to a method (MET-R) and apparatus (8) for receiving the channel feedback information in the wireless communication system.

13 Claims, 6 Drawing Sheets

(51) Int. Cl.
*H04B 7/04* (2006.01)
*H04B 7/02* (2006.01)
*H04L 1/00* (2006.01)
*H04L 1/18* (2006.01)

(52) U.S. Cl.
CPC ......... *H04B 7/0482* (2013.01); *H04B 7/0626* (2013.01); *H04B 7/0645* (2013.01); *H04L 1/0031* (2013.01); *H04L 5/0035* (2013.01); *H04B 7/0639* (2013.01); *H04L 1/1896* (2013.01)

(56) References Cited

U.S. PATENT DOCUMENTS

2010/0272019 A1* 10/2010 Papasakellariou et al. .. 370/328
2011/0176629 A1*  7/2011 Bayesteh et al. ............ 375/267

FOREIGN PATENT DOCUMENTS

WO    2012/097469 A1    7/2012
WO    2012/099273 A1    7/2012

OTHER PUBLICATIONS

Alcatel-Lucent, "Comparison of CSI Feedback Schemes," 3GPP TSG-RAN WG1 #57, San Francisco, USA, May 4-8, 2009, R1-092149, Agenda item: 15.2, Document for: Discussion and Decision, 10 pages.
Philips, "CSI feedback improvements for LTE-A based on multiple codebooks," 3GPP TSG RAN WG1 Meeting #57, San Francisco, USA, May 4-8, 2009, Tdoc R1-091725, Agenda Item: 15.6, Document for: Information, 8 pages.
Samsung, "Discussion on CoMP with Implicit CQI Feedback," 3GPP TSG RAN WG1 Meeting #58bis, Miyazaki, Japan, Oct. 12-Oct. 16, 2009, R1-094093, Agenda item: 7.5, Document for: Discussion and decision, 6 pages.
Huawei, et al. "Way Forward on CSI Feedback for CoMP," 3GPP TSG RAN WG1 #68, Dresden, Germany, Feb. 6-10, 2012, R1—120901, Agenda item: 7.5.1, 2 pages.
Database Inspec [Online] The Institution of Electrical Engineers, Stevenage, GB, Li Shi-Chao et al., "An Adaptive PMI Feedback Method for CoMP Joint Transmission," XP002693733, abstract, & Signal Processing Chinese Institute of Electronics China, vol. 27, No. 3, pp. 357-361, 2011.
Alcatel-Lucent Shanghai Bell et al., "CQI definition for CoMP," $3^{rd}$ Generation Partnership Project (3GPP), 3GPP TSG RAN WG1 Meeting #69, R1-122479, pp. 1-7, XP050601053, Prague, Czech Republic, May 21-25, 2012.
Ericsson et al., "RI and PMI sharing between multiple CSI processes," $3^{rd}$ Generation Partnership Project (3GPP), 3GPP TSG-RAN WG1 #69, R1-122836, 6 pages, XP050601012, Prague, Czech Republic, May 21-30, 2012.
International Search Report for PCT/EP2013/064453 dated Jul. 31, 2013.
P. Marsch et al., "Coordinated Multi-Point in Mobile Communications", Cambridge University Press, section 14.1.4, 2 pages, Aug. 2011.
N. Benvenuto et al., "Algorithms for Communications and Their Applications", Wiley 2002.
T. Wigren, "Soft Uplink Load Estimation in WCDMA", IEEE Transactions on Vehicular Technology, vol. 58, No. 2, pp. 760-772, Feb. 2009.
J.H. Winters, "Optimum Combining in Digital Mobile Radio with Cochannel Interference", IEEE Trans. Veh. Tech., vol. VT-33, No. 3, pp. 144-155, Aug. 1984.
"3rd Generation Partnership Project; Technical Specification Group Radio Access Network; Evolved Universal Terrestrial Radio Access (E-UTRA); Base Station (BS) radio transmission and reception (Release 10)," 3GPP TS 36.104 V10.7.0 (Jul. 2012), Technical Specification, 111 pages.

* cited by examiner

METHOD AND APPARATUS FOR TRANSMITTING CHANNEL FEEDBACK INFORMATION IN A WIRELESS COMMUNICATION SYSTEM AND METHOD AND APPARATUS FOR RECEIVING CHANNEL FEEDBACK INFORMATION IN A WIRELESS COMMUNICATION SYSTEM

FIELD OF THE INVENTION

The invention relates to wireless communications and, more particularly but not exclusively, to transmission and reception of channel feedback information in a wireless communication system.

BACKGROUND

In mobile communication networks, such as for example in 3G networks (3G=3rd Generation) or in 4G networks (4G=4th Generation networks), great effort is undertaken to increase the throughput of data that can be exchanged with multiple mobile UEs (UE=user equipment) sharing the radio resources available for one or multiple cells of the network. One cell or one transmission point serves multiple users such that the multiple users served by one cell or by one single transmission point need to share the available radio resources. One single base station, also denoted as NodeB or eNodeB, may serve multiple remote radio heads, antennas or antenna arrays, each of the antennas or of the antenna arrays being utilized to send data to and to receive data from a particular area. Several mobile units communicating simultaneously with the same antenna or the same antenna array share the radio resources or the available radio channels of the antenna.

In this respect, the term transmission point shall in the following be understood to be a device or an entity with which user equipments of the network communicates via a radio channel, such that all user equipments communicating with the same transmission point are able to share the radio resources or available radio channels. That is, the user equipments communicating with the same transmission point potentially interfere with each other in terms of bandwidth, cross-talk or the like. Apart from that potential interference, which can be handled by a serving transmission point alone, also two or more radio channels provided by two or more transmission points may interfere with each other at the location of the user equipment or a mobile station such as to decrease the achievable data rate for that user equipment or that mobile station. Such interference typically occurs at the border of the areas irradiated or served by neighboring transmission points, that is, at the borders of the areas or cells associated to the transmission points.

In order to account for the problem of such inter-transmission point interference and/or to increase the throughput of an existing network infrastructure, CoMP transmissions (CoMP=Coordinated MultiPoint) may be performed. In order to do so, two or more transmission points within a cluster of transmission points may share the information about the quality and the signaling parameters of some or of all of the UEs communicating via the individual transmission points of the cluster. Various approaches exist to enhance a network's efficiency or throughput by employing CoMP transmission in the uplink as well as in the downlink. Among these, for example, coordinated scheduling/beam forming for the downlink where user data is only available or transmitted at one transmission point, the so-called serving transmission point or serving cell, but user scheduling and beam forming decisions are made with coordination among the individual transmission points of a cluster. In joint processing CoMP user data is transmitted to user equipment via multiple transmission points. The so called joint transmission achieves an enhancement of the throughput by transmitting data of a data channel to a user equipment simultaneously via multiple transmission points.

All coordinated multipoint downlink implementations, however, require the knowledge of the transmission characteristics or the quality of the radio channels between all transmission points in the cluster potentially serving a particular user equipment and the respective user equipment. The transmission points being monitored by the user equipment and hence serve as candidates for establishing a downlink transmission are in the following also called the set of transmission points used for measurements. To this end, the user equipment is required to feed back some channel feedback information to the transmitter side. In the particular example of an LTE system (LTE=Long Term Evolution), for example pre-coding direction information is transmitted via a PMI (PMI=Pre-coding Matrix Indicator), while a CQI (CQI=Channel Quality Indicator) corresponds to a preferred MCS (MCS=Modulation and Coding Scheme). Enabling the network or some transmission point scheduling entity therein to perform scheduling decisions for CoMP in order to exploit the available network bandwidth to a high extent, however, requires that the network or the scheduling entity is continuously informed about the channel feedback information of all potential radio channels between all transmission points that are a candidate for a downlink transmission to a particular UE.

SUMMARY

The continuous signaling of channel feedback information for two or more potential transmission points requires a considerable amount of uplink bandwidth, thus leading to a decrease of the efficiency of the wireless communication system. Thus, it is an object of the invention to provide for a possibility to enhance the downlink efficiency or to provide an implementation of a coordinated multipoint transmission scheme for a wireless communication system in an efficient manner.

The object is achieved by a first method for transmitting channel feedback information in a wireless communication system. The first method contains the steps of determining a first reception quality value for a first radio channel from a first transmission point of the radio communication system to an apparatus, determining based on the first reception quality value a preferred use of the first radio channel, and transmitting towards the first transmission point the first reception quality value and the first reception quality value simultaneously indicates the preferred use. The object is further achieved by an apparatus for transmitting the channel feedback information in the wireless communication system.

The object is also achieved by a second method for receiving channel feedback information in a wireless communication system and by an apparatus for receiving the channel feedback information in the wireless communication system. The second method contains the steps of receiving a first reception quality value for a first radio channel from a first transmission point of the radio communication system to an apparatus and the first reception quality value simultaneously indicates a preferred use of the first radio channel, and determining based on the received first reception quality value the preferred use.

The first transmission point may be for example a serving base station or a serving access point. The apparatus may be for example a mobile station or user equipment.

The first and the second method provide the advantage of not requiring to signaling explicitly the preferred use. Instead of that, the preferred use is signaled implicitly by a transmission of the first reception quality value. This means, that the first reception quality value do not only provide information of the channel quality such as a first CQI for the first radio channel, but also provide information about, how the first radio channel shall be preferably applied for next downlink transmissions. Thereby, less feedback information needs to be signaled from the apparatus to the first transmission point and uplink radio resources can be used for other uplink signaling information or even for uplink payload data.

According to a preferred embodiment, the first method further contains the steps of determining, based on the first reception quality value, a size of feedback radio resources for transmitting at least one indication of at least one pre-coding vector for the first radio channel, and transmitting towards the first transmission point the at least one indication, and the preferred use is given by the size of the feedback radio resources for transmitting the at least one indication. The size of the feedback radio resources may be for example a number of digital bits or a number of digital bytes or a number of OFDM symbols (OFDM=Orthogonal Frequency Division Multiplexing). Thereby, the first reception quality value provides the information, how many feedback radio resources are applied for transmitting for example a first PMI, which indicates a pre-coding vector of a codebook. This means, the size of the feedback radio resources give a limit for a size of the codebook, from which the at least one pre-coding vector can be selected.

According to a further embodiment, the size of the feedback radio resources is provided by a mapping table. Preferably, the mapping table may be predefined at the apparatus and at a base station or at a central unit of the wireless communication system. The mapping table may be stored for example in a memory of a data storage device, which may be part of the central unit or the apparatus or may be stored on a SIM card (SIM=Subscriber Identity Module), which is placed in the mobile station or the user equipment. The mapping table provides the advantage of a fast algorithm with low complexity at the apparatus to determine a partitioning of the feedback radio resources and of a further fast algorithm with low complexity at the central unit to extract from the at least two quality values the partitioning of the feedback radio resources.

Preferably, the size of the feedback radio resources may depend on fulfilling one of at least two reception quality conditions of the mapping table. Further preferably, the mapping table contains a first mapping between a first size of the feedback radio resources and a first one of the at least two reception quality conditions and further contains at least a second mapping between a second size of the feedback radio resources and at least a second of the at least two reception quality conditions.

According to an even further embodiment, the mapping table contains at least two distributions of feedback radio resources for at least two overall sizes of the feedback radio resources. Thereby, it may be not required to update or to replace the mapping table at the apparatus by a transmission from the network to the apparatus, when the mobile stations containing the apparatus moves from a first area of the radio communication system, where a first number of antenna elements is applied at the first transmission apparatus to a second area of the radio communication system, where a second number of antenna elements is applied at a further first transmission apparatus.

In a further preferred embodiment, the method further contains the step of receiving the predefined mapping table or an update of the mapping table from a network node of the wireless communication system. This allows for more flexibility, when a mobile station moves for example from a first area of the wireless communication system, which applies a first type of mapping table to a second area of the wireless communication system, which applies a second type of mapping table or moves from a first radio communication system, which applies the first type of mapping table to a second radio communication system, which applies the second type of mapping table, because it is not required to store several mapping tables at the apparatus for all possible types of mapping tables and thereby a memory size of the data storage device located within the apparatus can be kept low.

According to a further embodiment, the method may further contain the step of determining at least a second reception quality value for at least a second radio channel from at least a second transmission point of the wireless communication system to the apparatus. In such a case, the determining step for the preferred use is further based on the at least second reception quality value and the preferred use is determined for one of the first radio channel and the at least second radio channel. The first transmission point may be for example a serving transmission point, which serves primarily the apparatus and the at least second transmission point may be for example a supporting transmission point, which serves the apparatus additionally. Regarding this embodiment, the central unit may control the first transmission point and the at least second transmission point for a coordinated transmission via the first radio channel and the second radio channel.

Preferably for the coordinated transmission, the transmitting step transmits the first reception quality value, when the first reception quality value is equal to or above a first predefined threshold and the transmitting step further transmits the at least second reception quality value or a reception quality value for a joint reception of the first radio channel and the at least second radio channel, when the at least second reception quality value is equal to or above a second predefined threshold and the at least second reception quality value or the reception quality value for the joint reception simultaneously indicates a preferred use of said at least second radio channel. The preferred embodiment allows to transmit a single reception quality value, which indicates the preferred use of a single radio channel, when the reception quality of the single radio channel is significantly larger (e.g. SINR value (SINR=Signal-to-Interference and Noise Ration) is 6 dB larger) than the further reception quality of a further radio channel and allows to transmit two or more reception quality values, which indicate the preferred use of two or more radio channels, when the reception quality of the two or more radio channels are approximately in a same range (e.g. SINR values don't differ more than 6 dB).

Preferably, the first method further contains the step of transmitting towards the first transmission point at least one further indication of at least one further pre-coding vector for the at least second radio channel, and the size of the feedback radio resources for transmitting the at least one indication is larger than a size of further feedback radio resources for transmitting the at least one further indication, when a reception quality of the first radio channel is better than a reception quality of the at least second radio channel. Having numerous potential radio channels between a single mobile transceiver and multiple transmission points it is, from Shannon's rate distortion theory, intuitive to use more feedback bits or uplink bandwidth for the transmission of information of a quality of a radio channel for an intrinsically good channel having a good transmission quality than for a poor channel.

The one of the at least two reception quality conditions may be for example a predefined difference value for a relative reception quality, which is defined by a difference between a third reception quality value for a joint reception of the first radio channel and the at least second radio channel and the first reception quality value. If only difference values may be stored in the mapping table in comparison to absolute reception quality values for a joint reception of the first radio channel and the at least second radio channel and for a single reception of the first radio channel, then a size of the mapping table can be reduced and a data storage device required for storing the mapping table can be kept even smaller and cheaper.

The mobile station or user equipment itself may propose a preferred configuration as to how radio channels for transmission of downlink data shall be configured. This may serve to decrease the bandwidth used for the signaling of channel feedback information while still leading to highly efficient downstream configurations. This may further increase the achievable throughput and the overall efficiency since the preferred use is determined by the user equipment or an associated apparatus for the mobile station itself. The apparatus may additionally account for its individual transmission characteristics and therefore make an optimal proposal such as to be able to exploit the available bandwidth to a maximum possible extent. The partitioning of the feedback radio resources as determined by the apparatus according to the present invention may hence comprise information on a proposal for a use of the first and the second transmission points for a downlink transmission. The partitioning of the feedback radio resources is determined by evaluating the information on the quality determined for the radio channels and, hence, goes beyond the content of the determined information on the quality itself. Further, the at least one of the first reception quality qualify value and the at least second reception quality value contains quality information for the first radio channel and for the partitioning of the feedback radio resources for transmitting one or several PMIs. Therefore, the transmitted at least one of the first reception quality value and the at least second reception quality value differs from the indication of a simple selection of one of a plurality of available transmission points.

A coordination of multipoint transmission may, for example, consider the fact that the better the characteristics or properties of a radio channel are known, the closer one may come to the maximum possible theoretical data rate transmittable via this particular channel. The knowledge on the transmission characteristics of a particular radio channel, however, is reported from the mobile station or user equipment by the transmission of some feedback or channel feedback information to the network, such as for example CSI (CSI=Channel State Information) in a LTE Network. This signaling consumes available bandwidth or data rate itself.

Given, for example, the constraint of a maximum number of affordable bits for the transmission of the channel feedback information for multiple transmission points, it may, motivated by Shannon's rate distortion theory, be advisable to invest more feedback bits for good radio channels than for poor radio channels. Particularly for a LTE-system, it may be appealing to invest more bits for the transmission of pre-coding matrix indicators of cells corresponding to stronger radio channels, which is to radio channels having a better determined quality. For example, in LTE-systems, transmission points having their channel feedback information reported using a larger amount of bits may use a larger codebook. Therefore, channel feedback information can be submitted with a higher accuracy which in turn leads to a better pre-coding for the transmission over the radio channel and hence to a higher achievable data rate.

Quality in terms of the present document may be understood to be any possible physical or logical quantity suitable to describe a quality of a radio channel, for example, a capability of transmitting data at a high rate and/or with small error rates. Examples for quality in that sense are signal to noise ratios or block error rates or the like. In some embodiments the channel feedback information on the quality of the radio channels may include phase information. For example, this could be a phase difference between the two transmission points. In other embodiments, the phase information may be implicitly included in the PMI. The particularly implemented option shall be known to both transmitter and receiver, and could, for example, be predefined by a wireless communication standard.

In the following, the term "set of transmission points" used for transmission denotes the group of transmission points which are in fact transmitting data in cooperative manner in a downlink direction to the user equipment. According to some embodiments of the invention, the channel feedback information includes one or several PMIs indicating a preferred pre-coding matrix for a down-stream transmission over each of the first and second radio channels and further includes the preferred use by one or several corresponding quality values such as CQIs.

The transmission of the preferred use for the transmission points and hence the possibility to, e.g., propose a particular set of transmission points used for transmission may increase the achievable downlink bandwidth even more as compared to alternative approaches where the number of available feedback bits may be distributed between different transmission points, while the number of transmission points used for transmission, that is the ones having an established radio channel with the user equipment in order to transmit payload data, remains fixed and determined by the network. When a fixed number of transmission points for transmission is assigned to a mobile station or user equipment without providing the possibility to signal a preferred use of the transmission points, the mobile station or user equipment is always receiving payload data from the transmission points in the network, even if the mobile station or user equipment may not provide channel feedback information to the network. The parallel transmission of the preferred use may hence avoid scenarios, where it does not make any sense to assume transmission/reception from transmission points in the network which are far apart from the mobile station or user equipment. The static approach may furthermore make it impossible to align the transmissions from different transmission points without costly phase alignment. Furthermore, the occurrence of CQI errors arising when transmitting CQIs to far apart transmission points may be avoided by utilizing embodiments of the present invention.

Some embodiments comprise a digital control circuit installed within the apparatus for performing the method. Such a digital control circuit, e.g. a digital signal processor (DSP), needs to be programmed accordingly. Hence, yet further embodiments also provide a computer program having a program code for performing embodiments of the method, when the computer program is executed on a computer or a digital processor.

Further advantageous features of the invention are defined and are described in the following detailed description of the invention.

BRIEF DESCRIPTION OF THE FIGURES

The embodiments of the invention will become apparent in the following detailed description and will be illustrated by accompanying figures given by way of non-limiting illustrations.

DESCRIPTION OF THE EMBODIMENTS

Various example embodiments will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like or similar elements through-out the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
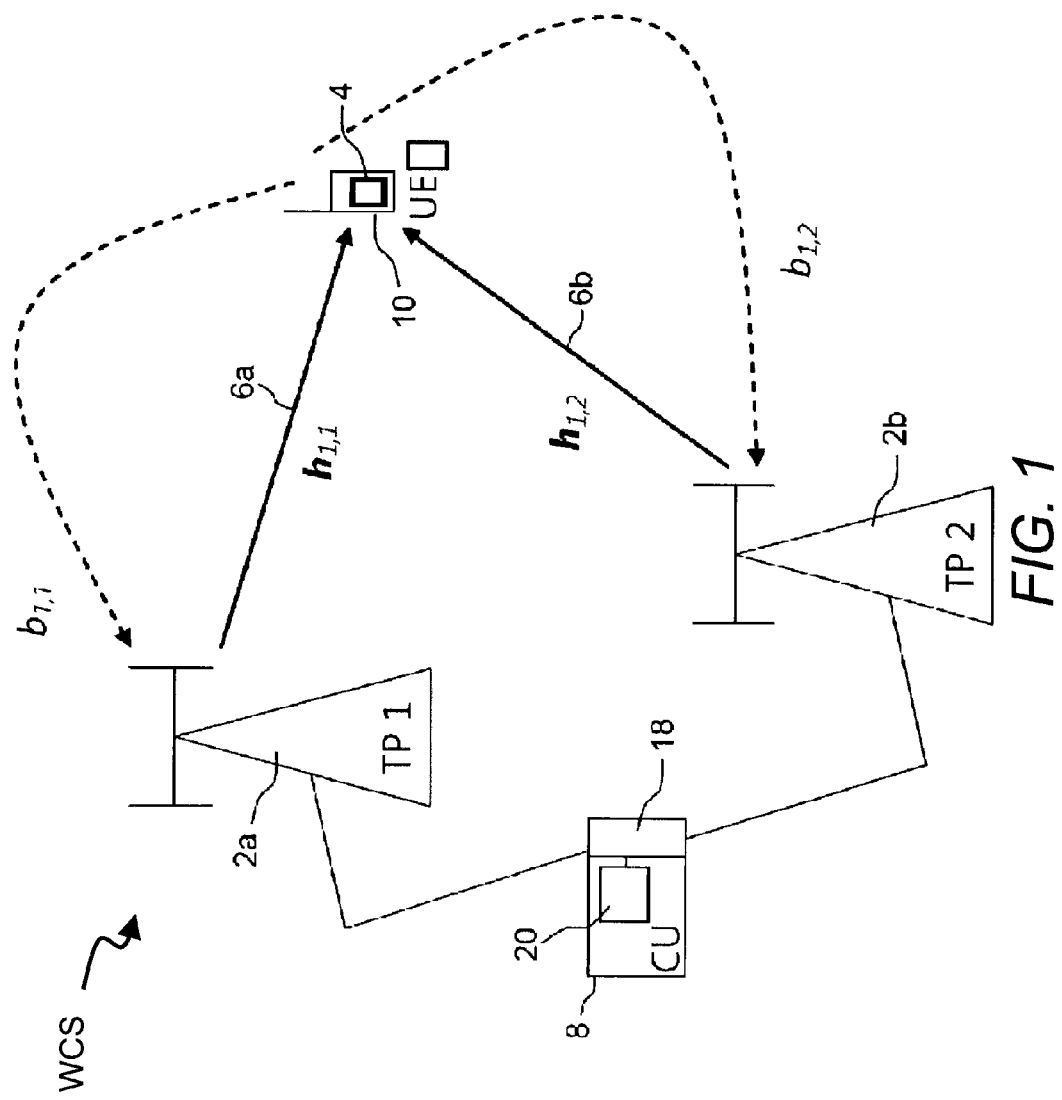
FIG. 1 shows a principal sketch of a network environment comprising an embodiment of an apparatus for coordinating a downstream transmission from two transmission points to a mobile transceiver.

FIG. 1 shows a principle sketch of a wireless communication system WCS having two transmission points, a first transmission point 2a and a second transmission point 2b and a user equipment 10, which contains an apparatus 4 for a mobile transceiver which is, in principle, capable of communicating with the first transmission point 2a and with the second transmission point 2b.

The term "transmission point" may be considered synonymous to and/or referred to as an antenna system, which is provided by a base transceiver station, base station, Node B, enhanced Node B, remote radio head, access point etc. The term "transmission point" may describe equipment that provides connectivity via a radio link between the wireless communication system WCS and the user equipment 10.

The term "user equipment" may be considered synonymous to, and may hereafter be occasionally referred to, as a mobile unit, mobile station, mobile user, access terminal, user equipment, subscriber, user, remote station etc. The mobile stations MS1, MS2 may be for example cellular telephones, portable computers, pocket computers, handheld computers, personal digital assistants, USB flash drives with a radio interface, data sticks or surf sticks to be connected to computer or tablet PC devices, tablets or PCs incorporating radio interfaces to exchange data or car-mounted mobile devices.

In particular, the apparatus 4 for the mobile transceiver may communicate downstream with the first transmission point 2a via a first radio channel 6a ($h_{1,1}$) and with the second transmission point 2b via a second radio channel 6b ($h_{1,2}$). The apparatus 4 may hence receive payload data in the downlink via the first radio channel 6a from the first transmission point 2a and in the downlink via the second radio channel 6b from the second transmission point 2b. The first and second transmission points 2a and 2b are coupled to an apparatus 8 for coordinating a downstream transmission from the first transmission point 2a and the second transmission point 2b to the apparatus 4 for the mobile transceiver. For conciseness and clarity of understanding, only two transmission points are shown in FIG. 1, which are in principle capable of operating as set of transmission points used for transmission to jointly transmit payload data via radio channels 6a and 6b. Of course, further embodiments of the present invention may employ or utilize more transmission points in the set of transmission points used for transmission or in the set of transmission points used for measurement. That is, the number of transmission points considered can in principle be arbitrary and in particular be higher than two or four. According to some embodiments, the number of transmission points used for measurement or for transmission may also be restricted by the apparatus 8, capable of sending a corresponding message to the apparatus 4 for the mobile transceiver.

Figure 2:
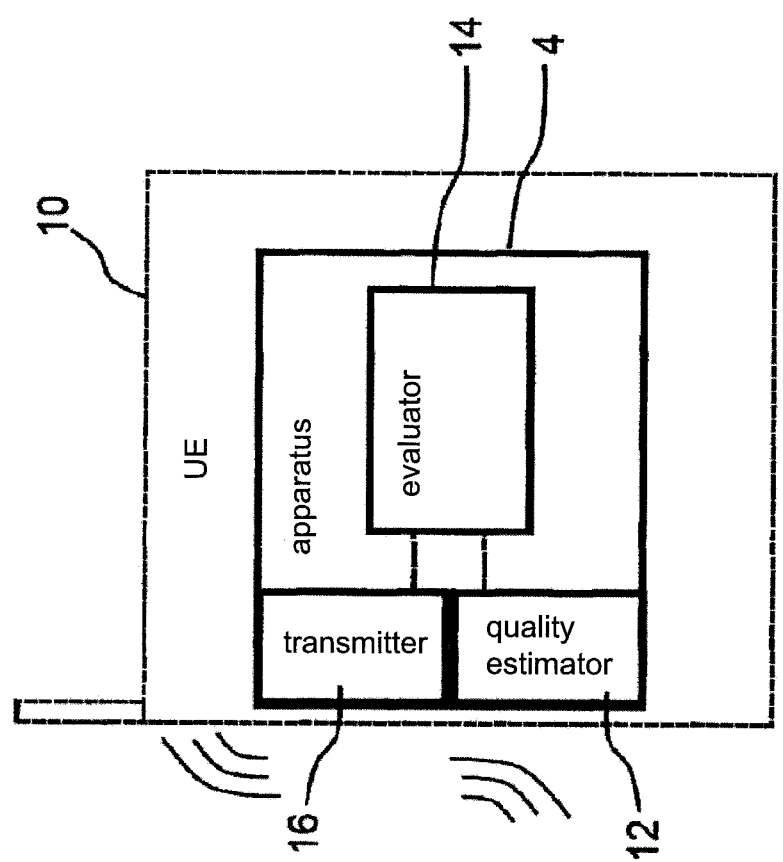
FIG. 2 shows an embodiment of an apparatus for a mobile transceiver communicating with a first transmission point via a first radio channel.

The user equipment 10 contains an embodiment of the apparatus 4 for the mobile transceiver as shown in FIG. 2. The functionality of the apparatus 4 for the mobile transceiver and of the apparatus 8 for coordinating the downstream transmission from the first and the second transmission points 2a and 2b will in the following be explained jointly with reference to FIGS. 1 and 2. Generally, the apparatus 4 for the mobile transceiver is further capable of transmitting channel feedback information in an uplink to either a single one of the transmission points 2a and 2b or to both of them simultaneously, such as to provide for the possibility to transmit channel feedback information about the radio channels 6a and 6b to the apparatus 8 for coordinating the downstream transmission.

Generally, the apparatus 4 for the mobile transceiver may be implemented within the UE 10, as for example indicated schematically in FIG. 2. The apparatus 4 may be implemented into the circuitry of a chip of the mobile transceiver or running as a software implementation on a processor within the mobile transceiver just to name two possible implementations. Furthermore, it is of course also possible to implement the apparatus 4 as a separate hardware device or chip such as to enhance the functionality of already existing mobile transceivers with a new chip.

The apparatus 4 for the mobile transceiver contains a quality estimator 12 operable to determine information on a quality of the first radio channel 6a and of the second radio channel 6b, such as, for example, a signal-to-noise ratio of the channel, block error rates of symbols transmitted over the channel or any other kind of information indicating a quality of the channel and/or an estimate of the amount of data transmittable via the first radio channel 6a and/or the second radio channel 6b.

The apparatus 4 further contains an evaluator 14 which is operable to evaluate the determined information on the quality of the first radio channel 6a and the second radio channel 6b such as to derive a preferred use of the first and the second radio channels 6a, 6b. That is, the evaluator 14 associated with the mobile transceiver may consider determined quality information at a time such as to propose or to derive a preferred use of the first and second radio channels 6a and 6b. The apparatus 4 further contains a transmitter 16 which is operable to transmit channel feedback information to the first and/or to the second transmission point 2a and 2b. The channel feedback information indicates the derived preferred use for example by containing at least one reception quality value, which may be selected from a group of reception quality values, which may contain a first reception quality value for the first radio channel 6a and preferably at least a second reception quality value for the at least second radio channel 6b, such as to enable the apparatus 8 for coordinating the downstream transmission to consider this information.

To this end, the information on the preferred use may be jointly transmitted via either the first transmission point 2a or the second transmission point 2b or jointly via both transmission points 2a and 2b. The transmission enables the apparatus 8 for coordinating a downstream transmission to receive and consider this information. As a matter of fact, further embodiments of the present invention may also utilize a separate direct channel for the communication with the apparatus 8 for coordinating a downstream transmission.

The preferred use may, for example, indicate that transmission via one of the two transmission points 2a or 2b is preferred, since the determined quality for the radio channels 6a and 6b gives rise to the assumption that an overall downlink bit rate may be increased by a particular configuration.

Channel feedback information may, for example, be the transmission of a proposed distribution of bits within a number of available bits for a transmission of a channel state information feedback of the first and of the second radio channels 6a and 6b. That is, the apparatus 4 may evaluate and provide a preferred use of the two radio channels 6a and 6b such that a proposal for a distribution of bits of a feedback of channel feedback information is performed. For example, when a total number B of available bits is eight, the apparatus 4 may propose to utilize five bits for the use of the transmission of the channel feedback information for the first radio channel 6a and the remaining three bits for the transmission of the channel feedback information for the second radio channel 6b, when it is assumed, that the first radio channel 6a is a serving radio channel and the second radio channel 6b is a supporting radio channel.

The apparatus 8 for coordinating the downstream transmission contains a receiver 18 operable to receive the channel feedback information from the UE 10, the channel feedback information indicating a preferred use of the first and second radio channels 6a, 6b, as determined by the apparatus 4. The apparatus 8 for coordinating the downstream transmission further contains a scheduler 20 operable to evaluate the channel feedback information and to determine a use of the first and second radio channels 6a, 6b based on the received preferred use. In general, the scheduler 20 evaluates the received proposal for the preferred use and determines an actually implemented use of the two radio channels 6a, 6b.

In order to further increase the overall performance of the radio communication system, the apparatus 8 may furthermore contain an optional transmitter operable to transmit selection information to the at least one mobile transceiver 10, the selection information may indicate an anchor or serving transmission point to be used for transmission and an associated threshold for a determined reception quality of a radio channel. One or several further transmission points to be applied as supporting transmission points may then only be proposed or included in the set of transmission points used for measurements when the threshold is met by the one or the several of the further transmission points.

Figure 3:
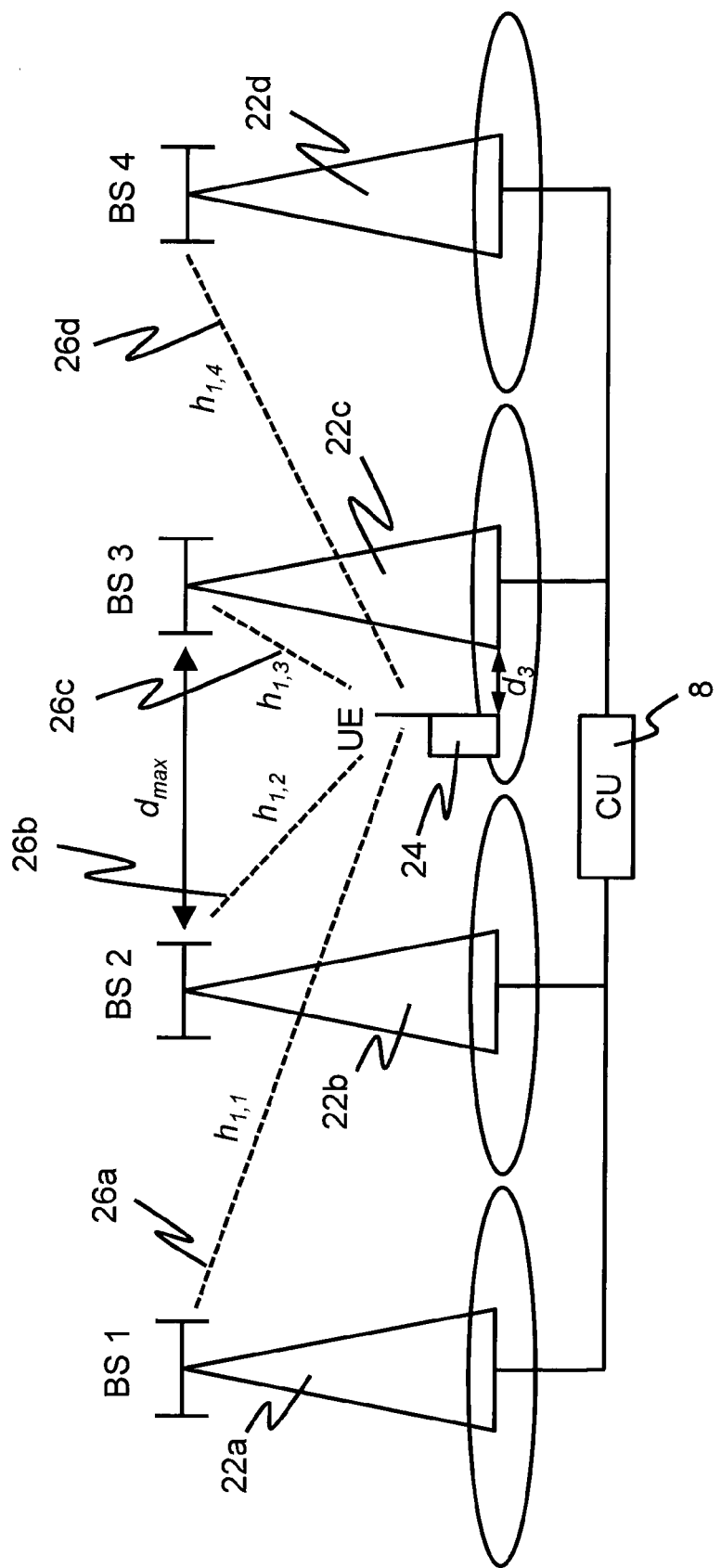
FIG. 3 shows a principal sketch of a network environment implementing an embodiment of the present invention.
Figure 4:
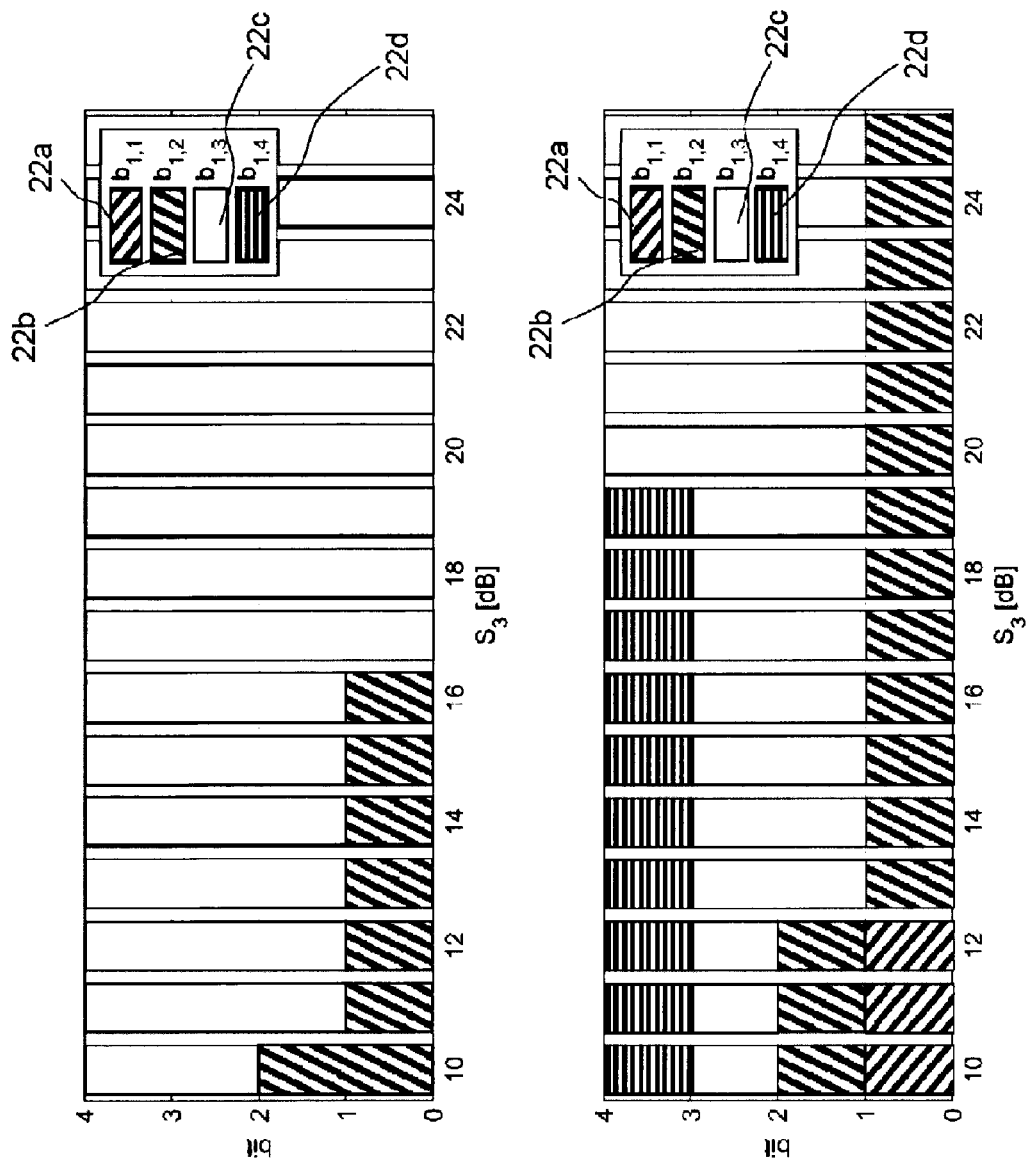
FIG. 4 shows two embodiments for a distribution of bits for a transmission of channel feedback information within the network environment of FIG. 3.

FIG. 3 shows an exemplary simplified radio or wireless communication system with four transmission points 22a to 22d and illustrates user equipment 24, which contains an apparatus 4 for a mobile transceiver as illustrated in FIG. 2. The user equipment 24 is capable of communicating with the four transmission points 22a to 22d via radio channels 26a to 26d, respectively. The bits proposed for signaling channel feedback information for the individual transmission points 22a to 22d are illustrated in FIG. 4, wherein the upper figure shows the proposed preferred use of bits according to a first particular embodiment or algorithm, wherein the lower figure shows the proposed use of bits according to a second particular embodiment or algorithm. The proposed distribution of bits is illustrated depending on the average signal-to-noise ratio (SNR) between the user equipment 24 and the third transmission point 22c as the serving transmission point depending on a parameter $S_3$, which may also be interpreted as a measure for the distance between the user equipment 24 and the transmission point 22c.

As illustrated in FIG. 3, the final scheduling decision may be taken by the apparatus 8 for coordinating the downstream transmission. However, FIG. 4 directly illustrates the proposal for the preferred use, that is, the proposed distribution of bits $b_{k,i}$ within the number of available bits B, which are in this particular example limited to four bits. The proposed distribution of bits $b_{k,i}$ within the number of available bits B is preferably stored in a mapping table similar to the mapping table shown in following Table 2 for the simplified case of two transmission points as shown in FIG. 1. According to the upper figure the bits proposed for signaling the channel feedback information allows a transmission of the preferred use with respect to two transmission points 22b, 22c or the single serving transmission point 22c depending on the parameter $S_3$. According to the lower figure the bits proposed for signaling the channel feedback information allows a transmission of the preferred use with respect to all four transmission points 22a, 22b, 22c, 22d or three transmission points 22b, 22c, 22d or two transmission points 22b, 22c also depending on the parameter $S_3$.

For the following considerations, which illustrate the concept with respect to an LTE network, the following notation is used: All vectors are column vectors. $\| \ldots \|$ is the 2-norm. A MIMO channel matrix $\tilde{H}_{i,l}$ of user i and radio cell l is of dimension M×N with M receive and N transmit antennas. $I_M$ is the identity matrix of size M.

Before turning to the particular embodiments, the following general considerations are introduced. We consider a system model, which is based on a narrowband channel, corresponding e.g. to a single subcarrier of a multi-carrier system. A cooperative downlink transmission channel to a particular user i can be represented by an overall CoMP channel matrix, formed by stacked MIMO channel matrices for L cooperating cells according to following equation:

$$H_i = [\tilde{H}_{i,1} | \ldots | \tilde{H}_{i,l} | \ldots | \tilde{H}_{i,L}] \quad (1)$$

Each MIMO matrix may be modeled as i.i.d. (i.i.d.=independent and identically distributed) Rayleigh fading channels with complex Gaussian coefficients. A composite CoMP matrix block-wise contains different average power levels, reflected by a cell isolation parameter.

We consider that the transmission points are perfectly synchronized in time and frequency and each TP (TP=transmission point) is connected by a free-errors and zero-delay backhaul link to a CU (CU=Central Unit), which may be the apparatus 8 for coordinating the downstream transmission and that allows full sharing of data and the CSI as a particular example of channel feedback information among all TPs. As TPs are in general not co-located, we also impose a maximum power $\overline{P}$ available at each TP. We assume that each UE has a limited number of feedback bits B to transmit to the wireless communication system WCS one or several PMIs and employs two or more per-cell codebooks. Of course, the same considerations also apply for scenarios, where the bits are used for other feedback information, or more generally, for any kind of channel feedback information. The feedback bits B is thus the available number of bits for the transmission of channel feedback information. In detail, a UE agrees with a TP on a set of B codebooks $C^{(b)} = \{c_1, c_2, \ldots, c_2 b\}$, b=1, 2, ..., B, where each so-called codeword or pre-coding vector $c_j$ is a unit-norm vector or size M×1.

A receive vector $y_i$ for a rank 1 transmission of a data symbol $s_i$, beamformed with the pre-coding vector $c_i \in C^{(b)}$ with respect to a number of active users K can be written as:

$$y_i = H_i c_i s_i + \Sigma_{k=1, k \neq i}^{K} H_i c_k s_k + z_i \quad (2)$$

Rank 1 transmission means a transmission of a single symbol stream from a transmission point to a single user equipment. The first summand in equation (2) contains a useful signal part, the second summand contains intra-cluster interference coming from all other simultaneous spatial symbol streams within the radio cell and the third summand as a noise vector $z_i$ represents thermal noise as well as out-of cluster interference from not explicitly modeled additional interfering clusters. The covariance of the noise vector $z_i$ is assumed to be $\sigma_n^2 I$, where $\sigma_n^2$ represents the noise variance. At an output of a linear receive combiner $g_i^T$ with unit transmit power, an SINR $\gamma_i$ for the pre-coding vector $c_i$ from a single transmission point to a single user may be computed by following equation:

$$\gamma_i = \frac{|g_i^T H_i c_i|^2}{\sum_{k=1, k \neq i}^{K} |g_i^T h_k c_k|^2 + \|g^T\|^2 \sigma_n^2} \quad (3)$$

With inaccurate CSI, the computation of $g_i^T$ may be based on CSIR (CSIR=CSI at a receiver side) $\hat{H}_i$, while the pre-coding vectors may be based on CSIT (CSIT=CSI at a transmitter side) $\check{H}_i$, using quantized, delayed measured channels; typically the pre-coding vectors are an entry of a codebook table, indicated by the PMI.

In an alternative, another link adaptation technique such as based on MIESM (MIESM=Mutual Information based exponential SNR Mapping) may be applied for calculating the SINR $\gamma_1$ (see "Coordinated Multi-Point in Mobile Communications", P. Marsch, G. Fettweis, Cambridge University Press, section 14.1.4). Instead of calculating SINR values, according to further alternatives SIR values (SIR=Signal-to-Interference Ratio) or SNR values (SNR=Signal-to-Noise Ration) may be calculated according to well-known algorithms, which are not given here in detail for simplification.

Furthermore, each UE agrees with the CU 8 on a functional relationship between channel qualities of the radio channels and a partitioning of the feedback radio resources. For the partitioning of the feedback radio resources for example $b_{k,j}$ bits may be allocated to quantize radio channel $h_{k,j}$ by using the following equation:

$$\Sigma_{j=1}^{J} b_{k,j} = B \quad (4)$$

with J as a number of radio channels for which feedback information is transmitted from the apparatus 4 to the CU 8. The distribution of the bits $b_{k,j}$ indicates the proposed distribution of bits within the number of available bits for the transmission of the channel feedback information as a preferred use of one or several radio channels for the cooperative downlink transmission.

Figure 5:
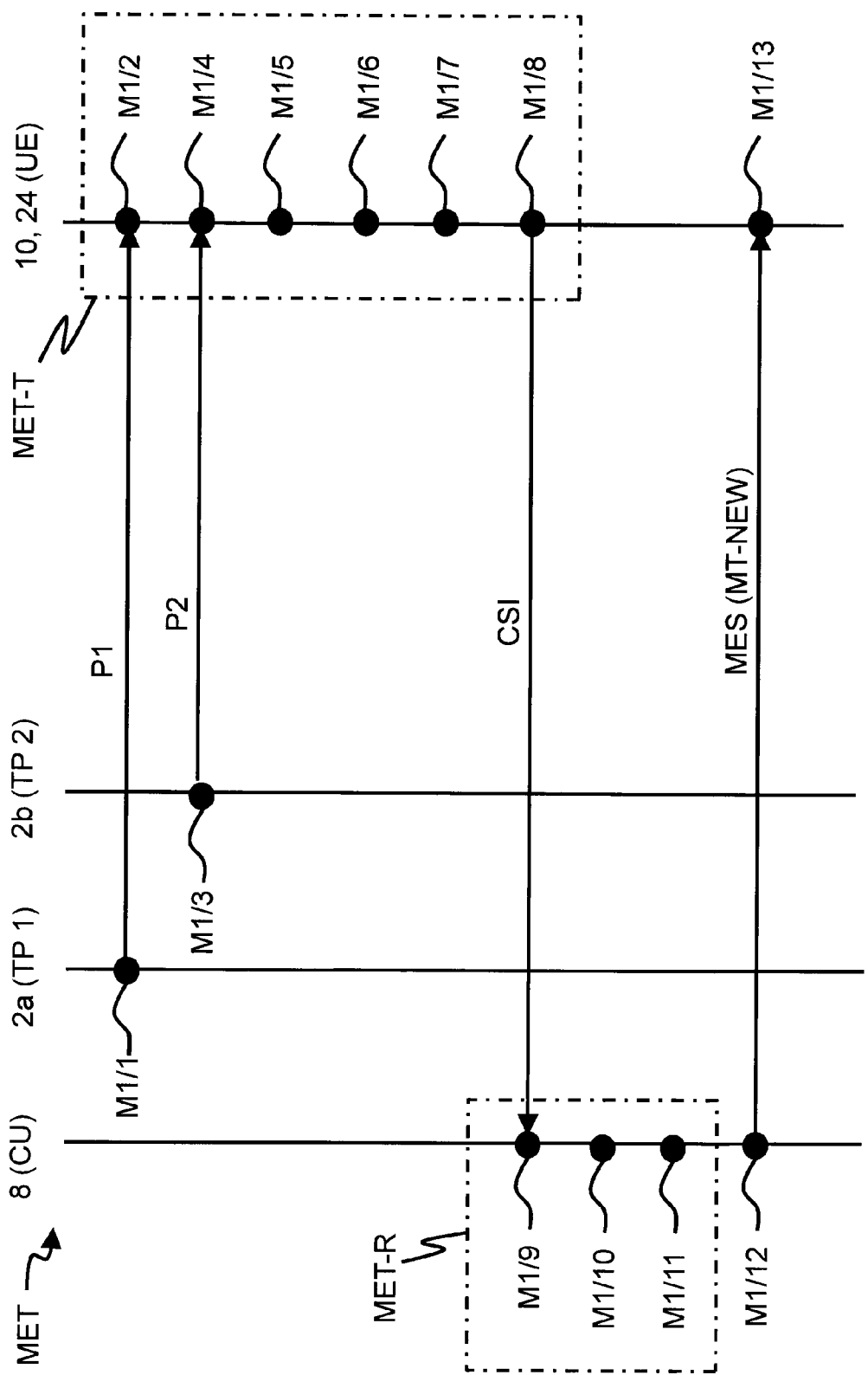
FIG. 5 shows a flow chart of a method for transmitting and receiving channel feedback information in a radio communication system and for transmitting information of a mapping table.

Referring now to FIG. 5 a flow diagram of a method MET in accordance to the embodiments of the invention is shown. The number of the steps for performing the method MET is not critical, and as can be understood by those skilled in the art, that the number of the steps and the sequence of the steps may vary without departing from the scope of the present invention as defined in the appended claims, e.g. some of the steps may be performed simultaneously (e.g. steps M1/1 and M1/3), some of the steps may be performed in an inverse sequence (e.g. step M1/4 may be performed before step M1/2) or some of the steps are ignored (e.g. step M1/7 as described below for at least one embodiment).

Steps M1/9, M1/10, and M1/11 of the overall method MET, which are performed by the CU 8 are part of a method MET-R for receiving the channel feedback information in the wireless communication system WCS and steps M1/2, M1/4, M1/5 to M1/8 of the overall method MET, which are performed by the UE 10, 24 are part of a further method MET-T for transmitting the channel feedback information in the wireless communication system WCS.

In a first periodically repeated step M1/1 the first transmission point 2a transmits via the first radio channel 6a by a first downlink transmission first pilots or first reference signals P1 preferably in an omni-directional way towards UEs such as the UE 10, 24, which are located in a coverage area (e.g. radio cell or radio sector) of the first transmission point 2a. The first pilots or first reference signals P1 are periodically received at the UE 10, 24 in a further step M1/2.

In a similar way, the second transmission point 2b transmits periodically by a next step M1/3 via the second radio channel 6b by a second downlink transmission second pilots or second reference signals P2 preferably also in an omni-directional way towards UEs, which are located in a coverage area of the second transmission point 2b. The UE 10, 24 may be located in an overlap region of the coverage area of the first transmission point 2a and of the coverage area of the second transmission point 2b. Therefore, the second pilots or second reference signals P2 are also periodically received at the UE 10, 24 in a further step M1/4.

The first pilots/reference signals P1 and the second pilots/reference signals P2, which are received by an antenna system of the UE 10, 24, are provided from the antenna system to the quality estimator 12 (not shown in FIG. 5 for simplification).

Then in a next step M1/5, the quality estimator 12 first performs in a first sub-step channel estimations based on the received pilots/reference signals P1, P2 and based on knowing a transmitted signal structure and power level of the pilots/reference signals P1, P2 preferably for calculating the channel matrices $\tilde{H}_{i,j}$ and for calculating $H_i$ (see equation (1)). Thereby, the third summand of equation (2) for the variance of the noise vector $z_i$ may be estimated by the quality estimator 12 by applying an algorithm such as described in T. Wigren, "Soft uplink load estimation in WCDMA", IEEE Trans. Veh. Tech., vol. 58, no. 2, pp. 760-772, February 2009 (see especially FIG. 3 and section IV, which describes the Kalman power estimation as one possibility for estimating the variance of the noise vector $z_i$), which is incorporated here by reference. This reference is only here given as an example. Also other algorithms well-known to a person skilled in the art may be applied for calculating the variance of the noise vector $z_i$.

In a further sub-step, preferably the quality estimator 12 also calculates the linear receive combiner $g_i^T$ for example by using an MMSE receiver (MMSE=Minimum Mean Squared Error) such as described for example in J. H. Winters, "Optimum Combining in Digital Mobile Radio with Cochannel Interference", IEEE Trans. Veh. Tech., vol. VT-33, no. 3, pp. 144-155, August 1984 (see especially equation (9)), which is incorporated here by reference. This reference is only here given as an example. Also other algorithms well-known to a person skilled in the art may be applied for calculating the linear receive combiner $g_i$.

Then, the quality estimator 12 determines in further sub-steps in each case a quality value such as an SINR value $\gamma_{i,n}$ according to equation (3) for each pre-coding vector $c_i$ of each codebook $C^{(b)}$ and for each transmission point, from which pilots/reference signals have been received. In further alternatives, the quality values may be determined only for a sub-set of transmission points and/or for a sub-set of the codebooks and/or for a sub-set of pre-coding vectors of selected codebooks. Then, in a further sub-step a largest sum-rate R is calculated by the evaluator 14, by maximizing the equation (4).

The equation (3) is given for a rank 1 transmission, when the transmission points 2a, 2b transmit a single data stream to the UE 10, 24. In case of a higher rank transmission such as a rank 2 transmission, the transmission points 2a, 2b transmit two data streams to the UE 10, 24. Thereby, a first data stream is transmitted via a first antenna element or a first group of antenna elements and a second data stream is transmitted via a second antenna element or a second group of antenna elements. For the higher rank transmission, the PMIs of the pre-coding vectors of the first data stream provide a first vector and the PMIs of the pre-coding vectors of the second data stream.

Those pre-coding vectors from the various transmission points, for which the maximum SINR $\gamma_i$ has been determined, may be indicated by signaling corresponding information from the UE 10, 24 to the CU 8 for example by transmitting one or several PMIs and one or several CQI values. A CQI value may be determined by the UE 10, 24 for example by using following look-up or mapping table 1, which is applied in 3GPP LTE Releases 8 and higher:

TABLE 1

| CQI value | SINR interval | |
|---|---|---|
| | SINR $\gamma_i \geq$ | SINR $\gamma_i <$ |
| 1 | | SINR1 |
| 2 | SINR1 | SINR2 |
| 3 | SINR2 | SINR3 |
| 4 | SINR3 | SINR4 |
| 5 | SINR4 | SINR5 |
| 6 | SINR5 | SINR6 |
| 7 | SINR6 | |

For the table 1 the following relations are used: SINR1<SINR2<SINR3<SINR4<SINR5<SINR6 with SINR1, SINR2, SINR3, SINR4, SINR5, SINR6 representing different SINR threshold values. If for example the calculated SINR $\gamma_i$ is within the interval SINR2$\leq \gamma_i <$SINR3, a corresponding CQI value is set to 3.

The quality estimator 12 may determine in even further sub-steps for each calculated SINR value $\gamma_i$ a corresponding CQI value according to table 1.

In case of other radio communication standards such as for example IEEE 802.11 (well-known as WLAN=Wireless Local Area Network) instead of a CQI value an RSSI value (RSSI=Received Signal Strength Indication) may be calculated and transmitted from the apparatus 4 towards the wireless communication system WCS.

For transmitting each of the one or several PMIs and the one or several CQIs, a specific amount of radio resources is required. If only a single codebook is used at the transmission points 2a, 2b and at the UE 10, 24 no information about a size of radio resources for transmitting a single PMI needs to be transmitted, because all PMIs require the same amount of radio resources. But if two or more codebooks with different numbers of pre-coding vectors are used at the transmission points 2a, 2b and at the UE 10, 24, the UE 10, 24 may transmit in addition to the PMI and a corresponding CQI also an indication of the codebook, from which the pre-coding vector is selected or an indication of a size of the radio resources, which are used for transmitting the PMI.

A PMI from a first codebook with for example 8 pre-coding vectors requires more radio resources (e.g. radio resources for transmitting 3 bits with bit settings in a range from 000 to 111 for indexing each of the 8 pre-coding vectors) than a PMI from a second codebook with for example 4 pre-coding vectors, which requires for example radio resources for transmitting 2 bits with bit settings in a range from 00 to 11. If for example a first PMI PMI1 for the first transmission point TP 1 has been selected from the first codebook and a second PMI PMI2 for the second transmission point TP2 has been selected from the second codebook, 5 successive bits may be used for transmitting the first PMI PMI1 and the second PMI PMI2. The receiving CU 8 needs to know, what is the last bit of the first PMI PMI1 and what is the first bit of the second PMI PMI2. This information may be signaled from the UE 10, 24 to the CU 8. For avoiding this explicit signaling an implicit signaling is preferably used in a way as described below:

In a further step M1/6, the evaluator 14 determines a partitioning of the feedback radio resources for the preferred use of the first radio channel 6a and/or the second radio channel 6b. Thereby, the preferred use may be given by a size of the feedback radio resources for transmitting for example a single PMI.

According to a general rule, which may be applied by the UE 10, 24 and by the CU 8, a size of a largest CQI, which has been determined with respect to a specific transmission point, may determine a size of a codebook, from which a pre-coding can be selected for reporting a PMI of the specific transmission point.

This general rule may be realized according to a first embodiment by applying a predefined mapping table at the UE 10, 24 and the CU 8. In following table 2 an exemplarily look-up or mapping table is given for a simple case of the set of the two transmission points 2a, 2b such as shown in FIG. 1 and for a fixed overall size of 8 bits for reporting the first PMI PMI1 and the second PMI PMI2.

TABLE 2

| Relative CQI difference $CQI_{diff}$ | Number of bits applied for signalling PMI of serving TP $b_{STP}$ |
|---|---|
| 5, 6 | 4 |
| 4 | 5 |
| 2, 3 | 6 |
| 1 | 7 |
| 0 | 8 |

A relative CQI difference $CQI_{diff}$ may be given for example by following equation:

$$CQI_{diff} = CQI_{joint} - CQI_{serving} \quad (5)$$

with $CQI_{joint}$ is a CQI value, which has been determined for a joint transmission from the first transmission point 2a and the second transmission point 2b and with $CQI_{serving}$ is a further CQI value, which has been determined for single transmission from the serving TP (e.g. the first transmission point 2a), which is primarily used for transmitting data to the UE 10, 24. The CQI value $CQI_{serving}$ may be calculated by setting L=0 in equation (1) and by applying for example equation (3) and Table 1. For calculating the CQI value $CQI_{joint}$ a pre-coding vector C may be applied, which is a stacked version of the pre-coding vector $c_1$ used for calculating the CQI value $CQI_{serving}$ and of one or several pre coding vectors $c_i$ with i=2, ..., L of one or several supporting TPs (e.g. the second transmission point 2b) which and may be written for the general case of L cooperating transmission points by following equation:

$$c = [c_i | \ldots | c_L] \quad (6)$$

The pre-coding vectors $c_1, \ldots, c_L$ may be selected from different codebooks with different numbers of pre-coding vectors.

For calculating the SINR for the joint transmission the terms $c_i$ and $c_k$ may be exchanged by the stacked pre-coding vector C in the equation (3). Then, the CQI $CQI_{joint}$ for the joint transmission may be determined by applying the look-up table 1.

Instead of using a single column for the relative CQI difference $CQI_{diff}$ the mapping table may alternatively contain two or more columns for absolute CQI values for the serving transmission point and for the one or several supporting transmission points.

According to a further alternative, the CQI values in the table 1 and the relative CQI difference $CQI_{diff}$ in the table 2 may be given in dB for example with a step size of 1 dB.

The CQI values in the table 1 could be biased in order to push the scheduler 20 to multiplex more UEs at a same time. In such a case, the CQI values are increased for example by 3 dB for guaranteeing a trade off between maximization of a performance (e.g. data throughput) of a UE associated to a specific CQI value and a maximization of an overall performance within a set of transmission points used for coordination downlink transmission to all UEs within a coverage of the set. By increasing/lowering the CQI values in the table 1, the scheduler 20 will probably select a higher number of UEs to be served at the same time.

From table 2 it can be deduced, that for the fixed overall size of 8 bits for reporting the first PMI PMI1 and the second PMI PMI2 all 8 bits may be used for reporting the first PMI PMI1, when the relative CQI difference $CQI_{diff}$ is in a range between 0 and 1. This means that in such a case a codebook with up to a number of $2^8$ pre-coding vectors may be applied for selecting and transmitting the first PMI PMI1 of the serving transmission point and no pre-coding vector is or no pre-coding vectors are selected and transmitted for one or several supporting transmission points. In such a case, a transmission quality from the wireless communication system WCS to the UE 4, 10 cannot be improved significantly, when a joint transmission from two or more transmission points is applied in comparison to a single transmission from a single serving transmission point. The preferred use means in this case a preferred downlink transmission via the first radio channel 6a.

From table 2 it can be also deduced, that 4 bits may be used for reporting the first PMI PMI1 and further 4 bits may be used for reporting the second PMI PMI2, when the relative CQI difference $CQI_{diff}$ is in a range between 5 and 7. In this further case, the number of bits may be evenly distributed across the serving transmission point and the supporting transmission point and thereby codebooks with up to a number of $2^4$ pre-coding vectors may be applied for selecting and transmitting the first PMI PMI1 and the second PMI PMI2. The further case is useful, when the additional usage of the supporting transmission point provides a significant improvement of the transmission quality for the joint transmission in comparison to the single transmission from the single serving transmission point.

Following table 3 shows a further look-up or mapping table with various partitioning of the feedback radio resources for different overall numbers of the feedback radio resources, which may depend on a number of the antenna elements applied at the first transmission point 2a and/or the at least second transmission point 2b and/or may depend on a reception quality of the joint reception.

TABLE 3

| $CQI_{diff}$ | If $N_{antenna} < 4$ and $CQI_{joint} \leq 5$ set B = 4 $b_{STP}$ | If $N_{antenna} \geq 4$ and $CQI_{joint} \leq 5$ set B = 8 $b_{STP}$ | If $N_{antenna} \geq 4$ and $CQI_{joint} > 5$ set B = 12 $b_{STP}$ | If $N_{antenna} < 4$ and $CQI_{joint} > 5$ set B = 6 $b_{STP}$ |
|---|---|---|---|---|
| 5, 6 | 2 | 4 | 6 | 3 |
| 4 | 2 | 5 | 8 | 4 |
| 2, 3 | 3 | 6 | 9 | 5 |
| 1 | 3 | 7 | 10 | 5 |
| 0 | 4 | 8 | 12 | 6 |

According to the second column of table 3 the overall number of bits B for transmitting PMI information may be set to a predefined value, which is 4 in this case, if for example the number of antenna elements at the first transmission point 2a or the at least second transmission point 2b is below 4 and if the CQI value $CQI_{joint}$ for the joint reception is equal to or below 5. Similarly according the further columns 3, 4 and 5, the overall number of bits B for transmitting PMI information may be set to further predefined values, if corresponding conditions as shown in Table 3 are fulfilled.

Depending on the selected overall number of bits B for transmitting PMI information, a corresponding portioning of the feedback radio resources for transmitting the PMI information is applied as also shown in Table 3. Table 3 is only given as an example. Further columns may be added for further conditions regarding the number of antenna elements and regarding further threshold values for the CQI value $CQI_{joint}$ for the joint reception.

According to a specific embodiment with a first overall size of 4 bits of the feedback radio resources for reporting at least one PMI two codebooks may be applied at the UE 10, 24 and at the CU 8. A first codebook may be predefined at the UE 10, 24 and the CU 8 with two bits for indexing the pre-coding vectors of the first codebook and a second codebook may be predefined at the UE 10, 24 and at the CU 8 with 4 bits for indexing the pre-coding vectors of the second codebook. This means, that the first codebook may contain 4 pre-coding vectors and the second codebook may contain 16 pre-coding vectors.

The first codebook and the second codebook may be identical for a subset or all transmission points of the wireless communication system. In such a case, the first codebook and the second codebook may be predefined at the UE 10, 24 for example by storing the first codebook and the second codebook on a SIM (SIM=Subscriber Identity Module).

In a further alternative, the first codebook and the second codebook may be transmission point specific. This means, that the first codebook and the second codebook may be optimized for each transmission point for example by performing measurements within a coverage area of a transmission point, when the transmission point is installed in the wireless communication system. For avoiding a storage of a huge number of codebooks at the UE 10, 24, in such a case it is preferable to download the first codebook and the second codebook for example from a current serving transmission point or from an LTE MME (MME=Mobility Management Entity) to the UE 10, 24 for a single transmission point or for a number of transmission points within a predefined area (e.g. a circular area with a radius of 5 km around a current position of the UE 10, 24).

According to a further embodiment, which may be not based on mapping tables such as the Table 2 or the Table 3 a so-called "one-shot" algorithm may be applied, which contains two conditions for deciding about the sizes and the partitioning of the feedback radio resources. According to a first condition, a largest CQI value $CQI_{anchor}$ for the serving transmission point may be compared with a first threshold value TH1 (e.g. TH1=6) according to following equation:

$$CQI_{anchor} \geq TH1 \qquad (7)$$

If the CQI value $CQI_{anchor}$ for the serving transmission point based on a pre-coding vector from the second codebook fulfills this equation, all 4 bits of the feedback radio resources may be applied for reporting for the serving transmission point the pre-coding vector, which has been applied for determining the largest CQI value $CQI_{anchor}$. In such a case, a CQI value for the supporting transmission point or several CQI values for several supporting transmission points may be not taken into account by the algorithm.

If the first condition cannot be fulfilled, the algorithm applies for the first transmission point 2a and the second transmission point 2b pre-coding vectors of the first codebook according to a second condition. Thereby, a largest CQI value for a supporting transmission point $CQI_{support}$ or the several largest CQI values for several supporting transmission points $CQI_{support,i}$ are taken into account by the algorithm, when following exemplarily given equations are fulfilled:

$$CQI_{anchor} < TH1 \text{ and } CQI_{support,i} - CQI_{anchor,i} \geq TH2 \qquad (8)$$

with TH2 as a second threshold value (e.g. TH2=1)

If the equations (8) are fulfilled, 2 bits of the feedback radio resources may be applied for reporting for the serving transmission point a pre-coding vector, which has been applied for determining the largest CQI value $CQI_{anchor}$ and remaining 2 bits of the feedback radio resources may be applied for reporting for the supporting transmission point a pre-coding vector, which has been applied for determining the largest.

The further embodiment can be easily extended to two or more supporting transmission points. If for example equation (8) is fulfilled by two supporting transmission points and the fixed overall size for the feedback radio sources may be 8 bits, then for example 4 bits may be applied for reporting a pre-coding vector with respect to the serving transmission point, 2 further bits of the feedback radio resources may be applied for reporting a pre-coding vector with respect to a first supporting transmission point and remaining 2 bits of the feedback radio resources may be applied for reporting a pre-coding vector with respect to a second supporting transmission point.

According to an even further embodiment, a preferred iterative algorithm may be applied for determining a partitioning of the feedback radio resources. In a first sub-step, the algorithm may start with a predefined tentative partitioning of the feedback radio resources between the serving transmission point and the one or several supporting transmission points. The predefined tentative partitioning may be based for example on a partitioning of feedback radio resources, which has been applied for a directly precedent feedback report. In an alternative, the predefined tentative partitioning may be based on long-term properties. For using these long-term properties, the UE 10, 24 may store in a memory preferably up to predefined number a partitioning of the feedback radio resources for a number feedback reports, which have transmitted to the CU 8, when the UE 10, 24 was served for example by the first transmission point TP1 and was also in an overlapping coverage area with the second transmission point TP2. If the UE 10, 24 contains a receiver of a satellite navigation system, the UE 10, 24 may further store a current location for each stored partitioning of feedback radio resources. Based on the stored partitioning of the feedback radio resources and preferably also based on location information, the evaluator 14 may apply a statistical analysis to select a partitioning of feedback radio resources, which has been mostly used preferably for a current location of the UE 10, 24.

In a further sub-step, the algorithm determines tentative CQI values according to equation (2) and the table 1 for the serving transmission point and according to the equation (3) and the table 1 for the supporting transmission point for a limited number of pre-coding vectors. The limited number of pre-coding vectors may be chosen from codebooks, which have a size that fits to the predefined tentative partitioning of the feedback radio resources. If for example a tentative partitioning for a total number of 8 bits is given by 5 bits for the serving transmission point and 3 bits for the supporting transmission point, the evaluator 14 applies with respect to the serving transmission point a first codebook, that contains 32 pre-coding vectors and applies with respect to the supporting transmission point a second codebook, that contains 8 pre-coding vectors.

In a next sub-step, a new partitioning of the feedback radio resources is determined by applying equation (5) and the table 2.

In a further sub-step, the iterative algorithm verifies, whether the new determined partitioning of the feedback radio resources is identical or different to the tentative partitioning of the feedback radio resources. If the new determined partitioning of the feedback radio resources is identical to the tentative partitioning of the feedback radio resources, the method MET continues with next step M1/8. If the new determined partitioning of the feedback radio resources is different to the tentative partitioning of the feedback radio resources, the new determined partitioning of the feedback radio resources is applied in next step M1/7 for determining corresponding adapted CQIs.

In the step M1/7, a single PMI and a single CQI or several PMIs and several CQIs may be selected for a transmission to the CU 8. The one CQI or the several CQIs, which have been determined in the step M1/5, is/are selected for PMIs of those pre-coding vectors, which are part of a codebook with a number of pre-coding vectors, which fits to the number of PMIs, that can be transmitted according to the partitioning of the feedback radio resources, which has been determined by the step M1/6. For example for the total number of 8 bits and a new determined partitioning of the feedback radio resources with for example 4 bits for the serving transmission point and further 4 bits for the supporting transmission point, the evaluator 14 may select the single PMI and the single CQI or the several PMIs and the several CQIs for a codebook, that contains 16 pre-coding vectors.

During the step M1/7, it may be verified according to equation (5) and the table 2, whether an index size of the single PMI or the several PMIs fit to the partitioning of the feedback radio resources, which has been determined according to corresponding CQI values. If the index size of the single PMI or the several PMIs fit to the determined partitioning of the feedback radio resources, the step M1/8 may be the next step. If the index size of the single PMI or the several PMIs don't fit to the determined partitioning of the feedback radio resources, one of two alternatives may be applied in a next sub-step to solve this issue. According to a first alternative, which may be a so-called "careful" feedback reporting, the evaluator 14 may lower by a step size of one or more either the CQI value $CQI_{joint}$ for the joint reception from the first transmission point 2a and the second transmission point 2b or the CQI value $CQI_{serving}$ for the single reception from the first transmission point 2a as the serving transmission point to find CQI values $CQI_{joint}$, $CQI_{serving}$ and a corresponding PMI or several corresponding PMIs, which index size fit to the new determined partitioning of the feedback radio resources.

According to a second alternative, which may be a so-called "aggressive" feedback reporting, the evaluator 14 may increase by a step size of one or more either the CQI value $CQI_{joint}$ for joint transmission from the first transmission point 2a and the second transmission point 2b or the CQI value $CQI_{serving}$ for the single transmission from the first transmission point 2a as the serving transmission point to find CQI values $CQI_{joint}$, $CQI_{serving}$ that fit to the new determined partitioning of the feedback radio resources. The type of feedback reporting such as the "careful" feedback reporting or the "aggressive" feedback reporting to be applied by the UE 10, 24 may be configured for example by higher layer signaling from the LTE MME or the respective LTE serving cell base station (the primary transmission point).

According to a further embodiment, instead of using different codebooks with different number of pre-coding vectors at the UE 10, 24 and at the CU 8 for the different sizes of the feedback radio resources, a single codebook may be applied at the UE 10, 24 and at the CU 8, which has a number of pre-coding vectors, which is adapted to a maximum size of the feedback radio resources for reporting a PMI. Then for each specific size of the feedback radio resources a specific selection routine is predefined at the UE 10, 24 and at the CU 8 for selecting pre-coding vectors for the single codebook. If for example, the maximum size of the feedback radio resources is 4 bit, the single codebook may contain a number of 16 pre-coding vectors. If the size of the feedback radio resources may be for example set to two bits, a first, a fifth, a ninth and a thirteenth pre-coding vector may be selected from the single codebook for performing the calculations according to the steps M1/5, M1/6 and M1/7.

Figure 6:
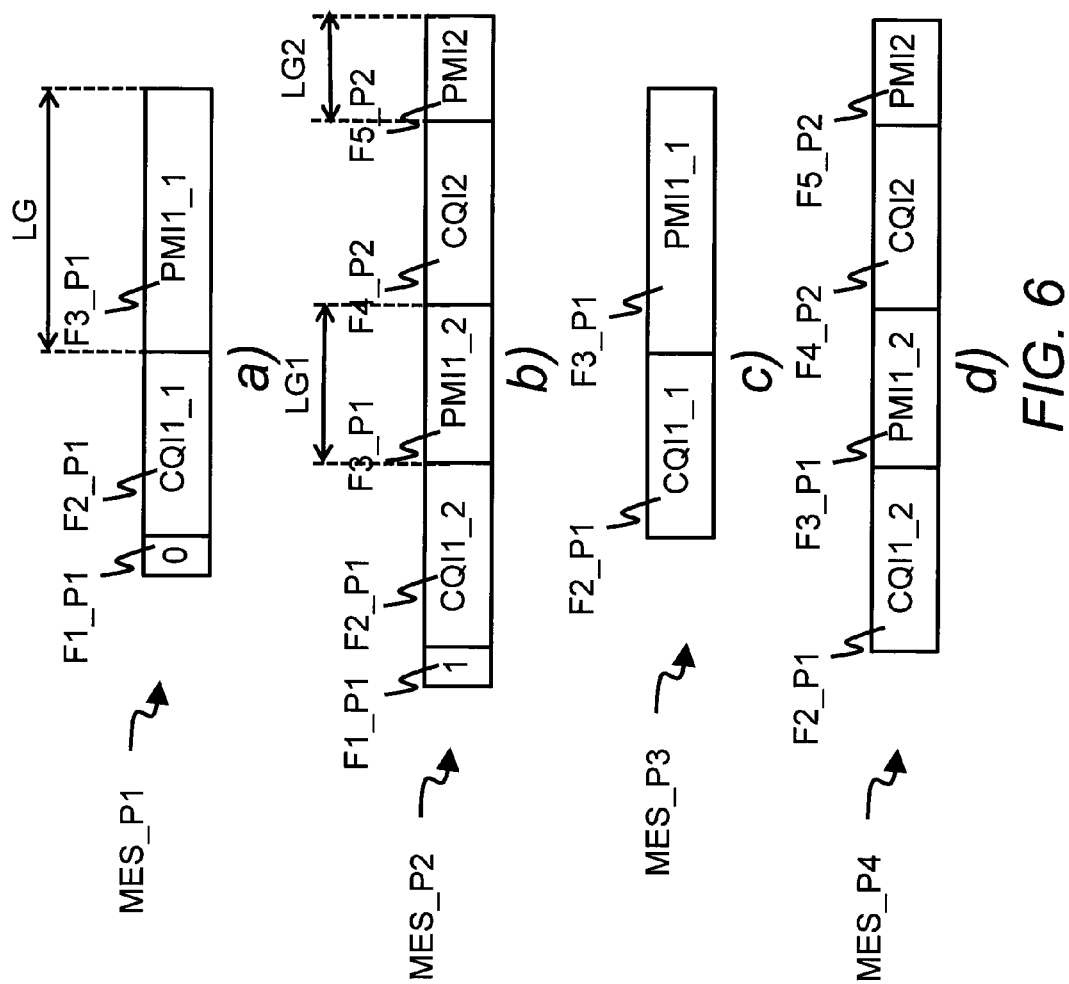
FIG. 6 shows four embodiments of a message format for transmitting one or several reception quality values and one or several indications for one or several pre-coding vectors.

In the step M1/8, the transmitter 16 transmits channel state information CSI to the CU 8, which receives the channel state information CSI by the receiver 18 in a further step M1/9. The channel state information CSI may contain for example in case of the first transmission point 2a and the second transmission point 2b a first CQI value, which may be an absolute CQI value for the serving transmission point 2a as determined from the Table 1, and a corresponding first PMI1 (see FIG. 6a) or FIG. 6c)). Depending on transmission channel conditions, the channel state information CSI may further contain a second CQI value, which may be an absolute CQI value for the supporting transmission point 2b or preferably the relative CQI difference $CQI_{diff}$ as calculated by equation (5), and a second PMI for a codebook regarding the support transmission point 2b (see FIG. 6b) and FIG. 6d)). The first CQI value or the first CQI value and the second CQI value implicitly provide the preferred use from the UE 10, 24 to the CU 8, which may be for example the partitioning of the feedback radio resources for transmitting one or several PMIs.

FIG. 6a) shows an exemplarily a first extract MES_P1 of the channel state information CSI, which may be transmitted from the UE 10, 24 to the CU 8. The first extract MES_P1 contains three sections F1_P1, F2_P1 and P3_P1, which may be bit fields within a predefined message format. A first section F1_P1 may be applied to indicate by "0", that only one CQI value and one PMI is contained in the message and to indicate by "1", that one or several further CQI values and PMIs are further contained in the channel state information CSI. A second section F2_P1 may be applied for transmitting the first CQI value CQI1_1 and a third section F3_P1 may be applied for transmitting the first PMI PMI1_1, which corresponds to the first CQI value CQI1_1. A length LG of the third section F3_P1 may illustrate the size of the feedback radio resources for transmitting the first PMI PMI1_1, which is implicitly provided from the UE 10, 24 to the CU 8 by a size of the first CQI value CQI1_1. In FIG. 6a) all feedback radio resources for transmitting PMIs is used for transmitting the first PMI PMI1_1, because a single transmission via the first radio channel 6a may be not further improved by a joint transmission via the first radio channel 6a and the second radio channel 6b.

FIG. 6b) shows an exemplarily a second extract MES_P2 of the channel state information CSI for a different environment with different CQI values. The second extract MES_P2 contains the three sections F1_P1, F2_P1 and P3_P1 and further two sections F4_P2 and F5_P2. The second section F2_P1 may be applied for transmitting a further first CQI value CQI1_2 and the third section F3_P1 may be applied for transmitting a further first PMI PMI1_2, which corresponds to the further first CQI value CQI1_2. A fourth section F4_P2 may be applied for transmitting the second CQI value CQI2 and a fifth section F5_P2 may be applied for transmitting the second PMI PMI2, which corresponds to the second CQI value CQI2. In FIG. 6b) the feedback radio resources for transmitting PMIs is split in the third section F3_p1 and the fifth section F5_P2 because the second radio channel 6b may be a good candidate together with the first radio channel 6a for a joint transmission to the UE 10, 24. A first length LG1 of the third section F3_P1 may illustrate the size of the feedback radio resources for transmitting the first PMI PMI1_1 and a second length LG2 of the fifth section F5_P2 may illustrate the size of the feedback radio resources for transmitting the second PMI PMI2 and an overall length of the first length LG1 and the second length LG2 may be equal to the length LG, which is shown in FIG. 6a).

FIGS. 6c) and 6d) show embodiments, which don't use the first section F1_P1 for transmitting an indication, whether the one or several further CQI values and PMIs are further contained in the channel state information CSI. Such indication is implicitly provided by a size of the first CQI value CQI1_1, CQI1_2. If the first CQI value CQI1_1 may be above a predefined threshold, which is known at the UE 10, 24 and the CU 8, a third extract MES_P3 of the channel state information CSI only contains the sections F2_P1 and F3_P1. If the first CQI value CQI1_2 may be below or equal to the predefined threshold a fourth extract MES_P4 of the channel state information CSI may contain for example the sections F2_P1, F3_P1, F4_P2 and F5_P2.

In a further step M1/10, the scheduler 20 of the CU 8 determines the sizes and the partitioning of the feedback radio resources with respect to the bit block by using, for example, the table 2.

In a next step M1/11, the scheduler 20 applies the determined partitioning of the bit block for being able to know, which part of the bit block belongs to a first PMI PMI1 with respect to the serving transmission point 2a and which potentially further part of the bit block belongs to a second PMI PMI2 with respect to the supporting transmission point 2b or which potentially further parts of the bit block belongs to further PMIs of two or more supporting transmission points. If according to a first example the bit block contains 8 bits and the second CQI CQI2 indicates a partitioning of the feedback radio resources as shown in the last row of the Table 2, the whole bit block is used to indicate a single pre-coding vector for the serving transmission point 2a. If according to a second example the bit block also contains eight bits and the second CQI CQI2 indicates a partitioning of the feedback radio resources as shown in the third row of the Table 2, first six bits of the bit block are applied for indicating a pre-coding vector for the serving first transmission point 2a and further two bits of the bit block are applied for indicating a pre-coding vector for the supporting second transmission point 2b. By knowing the sizes and the partitioning of the feedback radio resources with respect to the one or several PMIs, the scheduler 20 knows for the sizes of the feedback radio resources, which codebook has to be applied for a transmission point to obtain a corresponding pre-coding vector that has been indicated by the PMI.

When a self-optimization algorithm is applied in the wireless communication system WCS, the CU 8 or a network node of a core network of the wireless communication system WCS such as the LTE MME it may be tested for example for a specific propagation scenario of the UEs within the wireless communication system such as Extended Vehicular A (EVA), according to 3GPP TS36.104, if a modified mapping table of the table 2 provides a better performance such as a higher data throughput. The mapping table may be optimized to a specific spatial radio channel scenario a transmission point or several transmission points for example by applying a vector quantization algorithm such as the Linde-Buzo-Gray algorithm, which is described for example in N. Benvenuto, G. Cherubini, "Algorithms for Communications and Their Applications", Wiley, 2002. Therefore from time to time, the CU 8 may transmit in a further step M1/12 a message MES preferably in a broadcast or multicast to all UEs, which are located in a serving area of the CU 8. The message MES, which is received by the UE 10, 24 in a next step M1/13, may contain a new mapping table, which replaces an existing mapping table, or may contain one or several modified table entries and one or several indications, which entries shall be replaced by the modified table entries.

The message MES may be also sent, when the UE 10, 24 moves within the wireless communication system WCS to a new area with new transmission points for which no mapping tables are stored at the UE 10, 20. In such a case, new mapping tables are transmitted by the message MES to the UE 10, 24 for continue the inventive method within the new area.

The invention, which has been described regarding FIG. 1 to FIG. 6 for a CoMP transmission by the first transmission point 2a and the second transmission point 2b can also be used with respect to a single transmission point such as the first transmission point 2a. The preferred use may be in such a case a PMI of a pre-coding vector, which has been selected by the UE 10, 24 from a group of for example two codebooks. The first codebook may have four pre-coding vectors and the second codebook may have eight pre-coding vectors. This means for example, when the first CQI CQI1 is equal to or above the predefined threshold, a pre-coding vector from the second codebook may be selected, which requires a larger size of radio resources for transmitting a corresponding PMI than for a pre-coding vector from the first codebook. When else wise the first CQI CQI1 is below the predefined threshold, a pre-coding vector from the first codebook may be selected, which requires a smaller size of radio resources for transmitting a corresponding PMI than for a pre-coding vector from the second codebook. Regarding this embodiment, also more than two codebooks may be applied at the first transmission point 2a and the UE 10, 24.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as "means for . . . " (performing a certain function) shall be understood as functional blocks comprising circuitry that is adapted for performing a certain function, respectively. Hence, a "means for s.th." may as well be understood as a "means being adapted or suited for s.th.". A means being adapted for performing a certain function does, hence, not imply that such means necessarily is performing said function (at a given time instant).

Functions of various elements shown in the figures, including any functional blocks may be provided through the use of dedicated hardware, as e.g. a processor, as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

Further, it is to be understood that the disclosure of multiple steps or functions disclosed in the specification or claims may not be construed as to be within the specific order. Therefore, the disclosure of multiple steps or functions will not limit these to a particular order unless such steps or functions are not interchangeable for technical reasons. Furthermore, in some embodiments a single step may include or may be broken into multiple sub steps. Such sub steps may be included and part of the disclosure of this single step unless explicitly excluded.

The invention claimed is:

1. A method for an apparatus for transmitting channel feedback information in a wireless communication system, said method comprising:
    determining a first reception quality value for a first radio channel from said radio communication system to said apparatus,
    determining at least a second reception quality value for at least a second radio channel from said wireless communication system to said apparatus,
    determining based on said first reception quality value and further based on said at least second reception quality value a size of feedback radio resources for transmitting at least one pre-coding matrix indicator for one of said first radio channel and of said at least second radio channel, and
    transmitting, to a central unit, channel state information comprising at least one of said first reception quality value and said at least second reception quality value and comprising said at least one pre-coding matrix indicator,
    wherein at least one of said first reception quality value and of said at least second reception quality value simultaneously indicates to said central unit said size of feedback radio resources for transmitting said at least one pre-coding matrix indicator.

2. Method according to claim 1, wherein a size of a largest one of said first reception quality value and of said at least second reception quality value determines a size of a codebook from which a pre-coding is selected for reporting said at least one pre-coding matrix indicator.

3. Method according to claim 1, wherein said size of said feedback radio resources is a number of digital bits.

4. Method according to claim 1, wherein said size of said feedback radio resources is implicitly indicated from said apparatus to said central unit for coordinating downstream transmissions by applying a predefined mapping table at said apparatus and at said central unit, wherein said apparatus comprises a mobile station and said central unit comprises an apparatus for coordinating downstream transmissions.

5. Method according to claim 4, wherein said size of said feedback radio resources depends on fulfilling one of at least two reception quality conditions of said mapping table.

6. Method according to claim 4, wherein said mapping table comprises at least two distributions of feedback radio resources for at least two overall sizes of said feedback radio resources.

7. Method according to claim 4, wherein said method further comprises the receiving said predefined mapping table or an update of said mapping table from said apparatus.

8. Method according to claim 1, wherein said transmitting transmits said first reception quality value, when said first reception quality value is equal to or above a first predefined threshold, wherein said transmitting further transmits said at least second reception quality value or a reception quality value for a joint reception of said first radio channel and said at least second radio channel, when said at least second reception quality value is equal to or above a second predefined threshold and wherein said at least second reception quality value or said reception quality value for said joint reception simultaneously indicates a preferred use of said at least second radio channel.

9. Method according to claim 1, wherein said method further comprises the transmitting at least one further pre-coding matrix indicator for said at least second radio channel, and wherein said size of feedback radio resources for transmitting said at least one pre-coding matrix indicator is larger than a size of further feedback radio resources for transmitting said at least one further pre-coding matrix indicator, when a reception quality of said first radio channel is better than a reception quality of said at least second radio channel.

10. A method for an apparatus for transmitting channel feedback information in a wireless communication system, said method comprising:
   determining a first reception quality value for a first radio channel from said radio communication system to said apparatus,
   determining at least a second reception quality value for at least a second radio channel from said wireless communication system to said apparatus,
   determining based on said first reception quality value and further based on said at least second reception quality value a size of feedback radio resources for transmitting at least one pre-coding matrix indicator for one of said first radio channel and of said at least second radio channel, and
   transmitting channel state information comprising at least one of said first reception quality value and said at least second reception quality value and comprising said at least one pre-coding matrix indicator,
   wherein at least one of said first reception quality value and of said at least second reception quality value simultaneously indicates said size of feedback radio resources for transmitting said at least one pre-coding matrix indicator;
   wherein said size of said feedback radio resources is implicitly indicated from said apparatus to an apparatus for coordinating downstream transmissions by applying a predefined mapping table at said apparatus for coordinating downstream transmissions;
   wherein said size of said feedback radio resources depends on fulfilling one of at least two reception quality conditions of said mapping table;
   wherein said one of said at least two reception quality conditions is a predefined difference value for a relative reception quality that is defined by a difference between a third reception quality for a joint reception of said first radio channel and said at least second radio channel and said first reception quality value.

11. An apparatus for transmitting channel feedback information in a wireless communication system, said apparatus comprising:
   a quality estimator operable to determine at a first reception quality value for a first radio channel from said radio communication system to said apparatus and to determine at least a second reception quality value for at least a second radio channel from said wireless communication system to said apparatus,
   an evaluator operable to determine based on said first reception quality value and further based on said at least second reception quality value a size of feedback radio resources for transmitting at least one pre-coding matrix indicator for one of said first radio channel and of said at least second radio channel, and
   a transmitter operable to transmit to a central unit channel state information comprising at least one of said first reception quality value and said at least second reception quality value and comprising said at least one pre-coding matrix indicator,
   wherein said at least one of said first reception quality value and of said at least second reception quality value simultaneously indicates to said central unit said size of feedback radio resources for transmitting said at least one pre-coding matrix indicator.

12. A method for coordinating downstream transmissions in a wireless communication system, said method comprising receiving channel state information comprising at least one of a first reception quality value for a first radio channel from a radio communication system to an apparatus and of at least second reception quality value for at least a second radio channel from said wireless communication system to said apparatus and comprising at least one pre-coding matrix indicator pre-coding matrix indicator for one of said first radio channel and of said at least second radio channel,
   wherein at least one of said first reception quality value and of said at least second reception quality value simultaneously indicates a size of feedback radio resources for transmitting said at least one pre-coding matrix indicator, and
   wherein said size of feedback radio resources is determined based on said first reception quality value and further based on said at least second reception quality value,
   said method further comprises determining based on said received at least one of said first reception quality value and said at least second reception quality value said size of feedback radio resources and a partitioning of said feedback radio resources for knowing which codebook has to be applied for at least one transmission point to obtain a corresponding pre-coding vector that has been indicated by said at least one pre-coding matrix indicator.

13. An apparatus for coordinating downstream transmissions in a wireless communication system, said apparatus comprising a receiver operable to receive channel state information comprising at least one of a first reception quality value for a first radio channel and of at least second reception quality value for at least a second radio channel and comprising at least one pre-coding matrix indicator for one of said first radio channel and of said at least second radio channel,
   wherein said at least one of said first reception quality value and of said at least second reception quality value simultaneously indicates a size of feedback radio resources for transmitting said at least one pre-coding matrix indicator, wherein said size of feedback radio resources is determined based on said first reception quality value and further based on said at least a second reception quality value and
   said apparatus further comprises a scheduler operable to determine based on said received at least one said first reception quality value and said at least second reception quality value said size of feedback radio resources for transmitting said at least one pre-coding matrix indicator.

\* \* \* \* \*